Oct. 26, 1926.  1,604,752

F. L. LOWE

AUTOMATIC SAFETY APPARATUS FOR AUTOMOBILES

Filed May 1, 1926     3 Sheets-Sheet 1

INVENTOR
Frank L. Lowe
BY
ATTORNEY

Oct. 26, 1926.
F. L. LOWE
1,604,752
AUTOMATIC SAFETY APPARATUS FOR AUTOMOBILES
Filed May 1, 1926
3 Sheets-Sheet 2
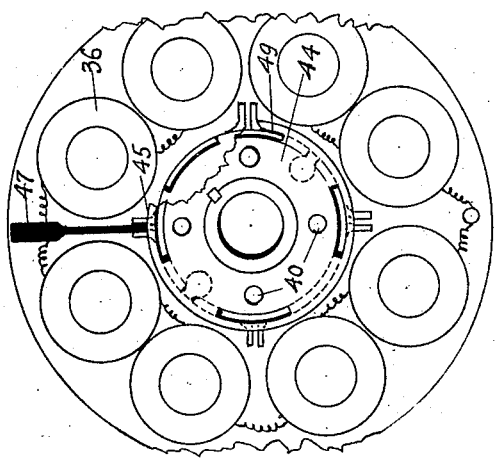
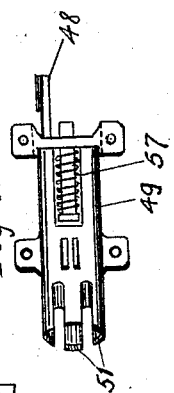
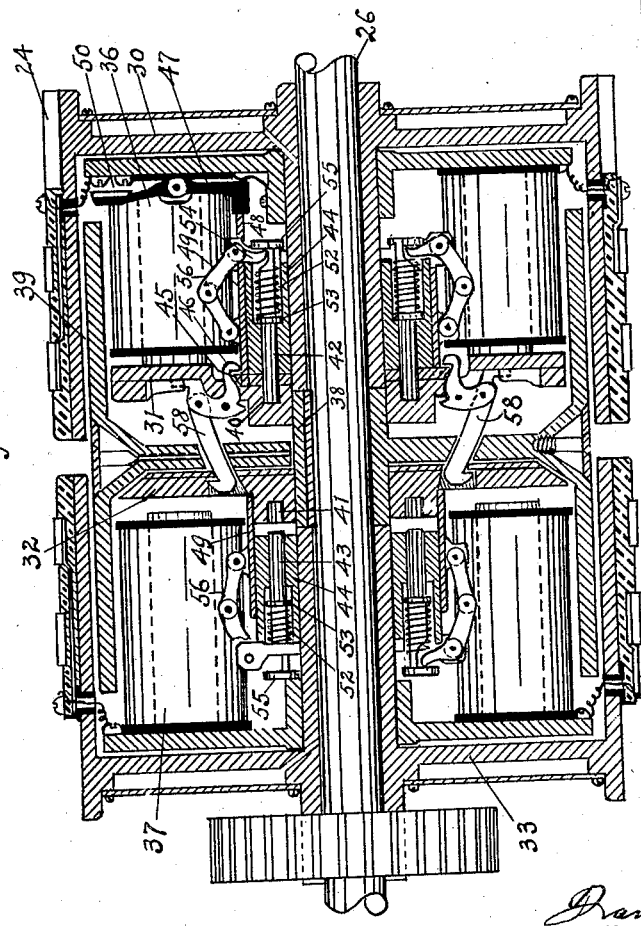
INVENTOR
Frank L. Lowe
BY
ATTORNEY Oct. 26, 1926.
F. L. LOWE
1,604,752
AUTOMATIC SAFETY APPARATUS FOR AUTOMOBILES
Filed May 1, 1926    3 Sheets-Sheet 3
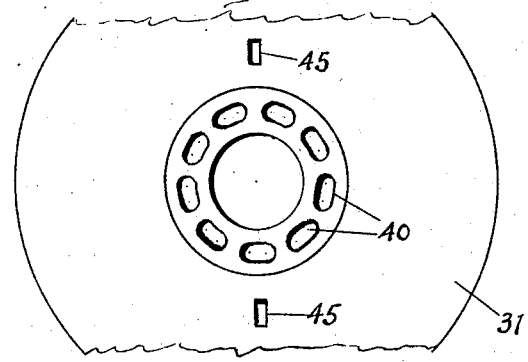
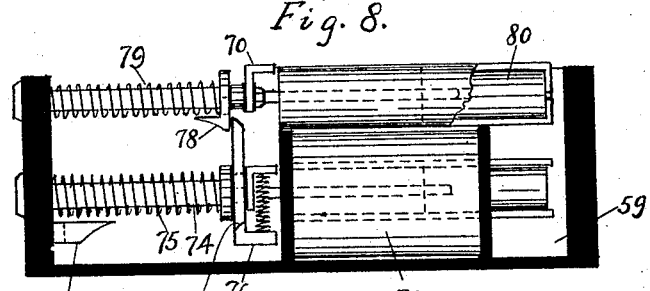
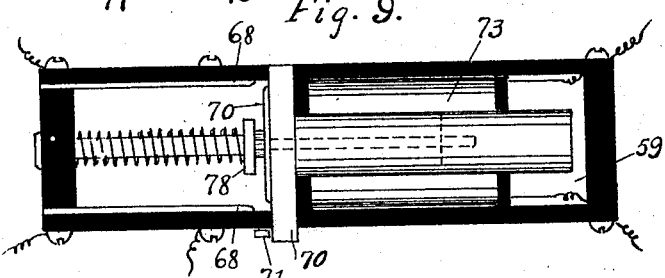
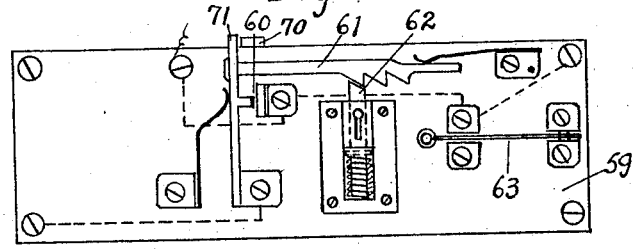
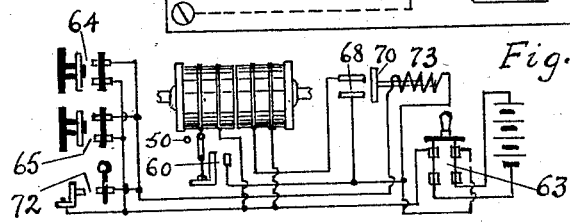
INVENTOR
Frank L. Lowe
BY
ATTORNEY Patented Oct. 26, 1926.

1,604,752

UNITED STATES PATENT OFFICE.

FRANK L. LOWE, OF NEW YORK, N. Y.

AUTOMATIC SAFETY APPARATUS FOR AUTOMOBILES.

Application filed May 1, 1926. Serial No. 106,006.

The invention relates to safety apparatus, more particularly to apparatus intended for use with transportation vehicles whereby the forward movement of same may be instantaneously arrested and the motion of the vehicle reversed.

The invention has for its object safety mechanism of this character by which impact of the vehicle with an object, or actuation of a suitable circuit closing member, will cause a limited reverse movement of the vehicle, whereupon the running gear of the vehicle is automatically placed in neutral condition. A further object of the invention consists in electrical mechanism for effecting the arresting and reversal of the vehicle wherein current is not consumed during the normal operation of the vehicle, the same being momentarily applied only in the initial setting of the apparatus and in case of an emergency.

To this end, the invention comprises a pair of electro-magnetic clutch members, included in the drive for the vehicle, and an electrical controller device therefor operated by the closing of an electric circuit, for example, on impact of the vehicle with an object, or by the closing of a switch under the control of the operator of the vehicle.

The nature of the invention, however, will best be understood when described in connection with the accompanying drawings, in which—

Fig. 4 is a longitudinal section thru the double clutch member employed.

Fig. 5 is a fragmentary front elevation of one half of one of the clutch members, with portion broken away; and Fig. 6 is a similar view of the other half of the clutch member.

Fig. 7 is a detail perspective fragmentary view, on a reduced scale, of a sleeve member employed in the clutch.

Figs. 8, 9 and 10 are respectively a rear elevation, a plan and a front elevation of the controller member.

Fig. 11 is a wiring diagram illustrating the electrical connections.

Figure 1:
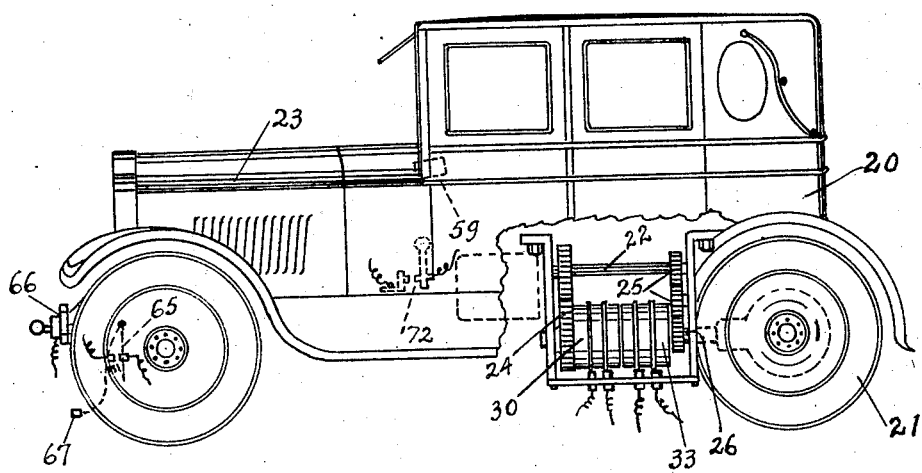
Fig. 1 is a side elevation of an automobile with the safety mechanism applied thereto and a portion of the body of the car broken away to disclose a double clutch member and the driving connection to the driving wheels of the vehicle.
Figure 2:
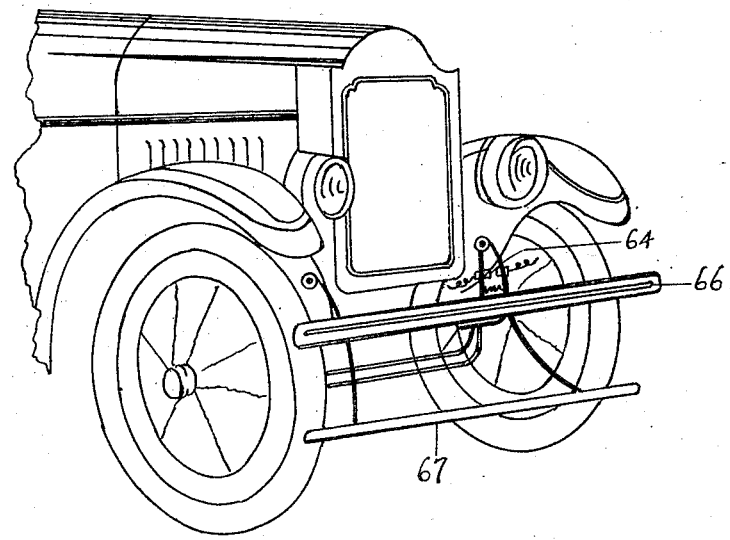
Fig. 2 is a fragmentary perspective view showing the mounting of the impact circuit-closing mechanism.
Figure 3:
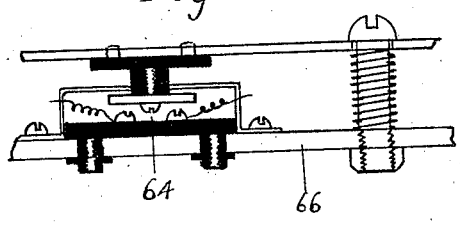
Fig. 3 is a fragmentary detail plan view of the impact circuit-closing mechanism.

Referring to the drawings, 20 designates, as one type of vehicle to which the invention may be applied, a self-propelled vehicle such as an automobile of any well-known construction; and the same is provided with the usual rear driving wheels 21 and drive shaft 22 operated from an engine contained in the hood 23 in manner well understood. It will be observed, however, that the drive shaft 22 does not extend directly to the drive wheels 21 as is the usual practice. In accordance with the present invention, two intermediate trains of gearing 24 and 25 are provided between the drive shaft 22 and a clutch shaft 26, which latter shaft is connected and operates in the usual manner the driving wheels 21. The one train of gearing 24 comprises two spur gear wheels, while the other train 25 includes in addition an intermediate gear wheel so that the rotation transmitted by one train is the reverse of that transmitted thru the other.

On the clutch shaft 26 is secured a double electromagnetic clutch member comprising the two pairs of clutch halves 30, 31 and 32, 33. To one of the halves of the respective clutches is fixedly secured one of the gears of the trains 24 and 25 respectively so that each said half portion of the double clutch will have imparted thereto the rotation of the drive shaft 22 but in reverse directions, it being understood that said gear halves of the respective clutches rotate freely upon the shaft 26 and communicate directly no motion thereto. When a particular clutch member is energized, in manner hereinafter set forth, one or the other of the aforesaid gear trains will be connected thru its other clutch half to the shaft 26 to communicate rotation thereto in a direction to send the vehicle forwardly or reversely accordingly as the particular clutch is energized.

To effect this operation, the other valves 31 and 32 of the double clutch member are in the nature of sliding rings or annular disks which are adapted to be attracted by two sets of coacting electro-magnets 36 and 37, respectively, and circularly arranged about the shaft 26, the disks being slidable over a hub 38 of a pulley 39 or fly wheel keyed to the shaft 26. These disks, furthermore, are designed to rotate with the pulley member 39 which is disposed therebetween and are provided also with a series of circularly disposed elliptical openings or recesses 40 and 41 respectively and which are designed to receive pins 42 and 43 respectively. These pins are slidably carried by the respective clutch halves 30 and 33, or rather by bushings 44 keyed thereto, driven by the corresponding gear trains and carrying also the aforesaid electro-magnets. When a disk is attracted by its corresponding magnets, due to energization of the latter, the pins are set in the recesses or openings 40 and 41 and thus lock the driven half of a clutch portion to the driving half or disk which in turn is slidably keyed to the hub 38 of the pulley 39 and thru the latter to the shaft 26 and thus imparts its rotation thereto for transmitting the propelling power to the wheels. In the case of one of the clutch members, furthermore, provision is made to lock this engagement of pin and recessed sliding disk member, and for this purpose in front of the outer end of a bushing 44 there is provided a washer having a projecting portion 45 over which and behind the same is adapted to drop latch or detent members 46 attached to the disk 31 and passing inwardly thru the wall thereof as indicated in the right hand clutch portion, Fig. 4 of the drawings. This insures the continuation of the clutch engagement for imparting rotation to the shaft 26 even if the energizing current be cut off, provision for which is made by means of a spring-urged contact lever 47, pivoted to the magnet base, one arm of which is designed to be moved by an extension 48 of a sliding sleeve member 49, Figs. 4 and 7, to open the circuit at contacts 50. The sleeve member 49 surrounds and slides axially upon the corresponding bushing 44 and at its forward end is inwardly slotted to accommodate the projecting portion 45, fingers 51 of the sleeve passing thru corresponding openings therein. Moreover, the locking pins of the bushings are designed to be urged outwardly toward the corresponding recesses by springs 52 coiled about their respective inner ends and pressing against a flange 53 of a pin, which flange acts also as a stop to limit the extent of outward motion. Normally, however, a pin is held in retracted position thru engagement of a finger 54 with an inner lug 55 of the pin. A finger 54 is carried by one arm of a toggle 56, one arm thereof being attached to the bushing and the other to the sliding sleeve member 49. By this expedient, when the sleeve slides backwardly under the influence of a corresponding movable clutch half, finger 54 moves outwardly and permits a pin to move correspondingly under the influence of its spring 52. When the sleeve moves in the opposite direction, the pin is withdrawn by the toggle; and a spring 57, Fig. 7, tends to urge said sleeve normally in the direction of the corresponding movable clutch half to assist in withdrawing the pins.

The portion of the clutch device just described is intended to control the forward motion of the vehicle; and it will thus be appreciated that after the magnet has once been energized to set this particular clutch portion, the circuit may be opened at contacts 50 and the apparatus thus operate without consumption of current. The other clutch portion is designed for operation only when an emergency exists. When the magnets 37 thereof are energized under these conditions to operate this last-named portion of the clutch, the corresponding disk member or clutch half 32 will be attracted thereto and will draw with it the other disk member 31 thru a series of arms or links 58 connecting the two disk members. This will serve to disestablish the driving connection to the shaft 26 of the forwardly driving train thru engagement previously established between the corresponding recesses and pins. Engagement of the sleeve ends with the respective disks will also assist in the disestablishment of the connection thru the action of springs 57. Provision is made in the controller device 59, employed in the apparatus, for cutting off the current to said electro-magnets 37 after a predetermined length of time, whereupon the disk 32 will be thrown back into disengaged position, as indicated in Fig. 4 of the drawings, under the action of the springs 57.

To effect the energization of the forwardly driving clutch portion magnets 36, the controller 59, which is located conveniently to the driver of the car, is provided with an initiating contact making switch 60 which may be locked in closed position thru the sliding rachet arm 61 and spring pressed detent 62 adapted to engage the teeth thereof. A further switch 63 may be provided to control the power supply which will be taken from the usual storage battery common to self-propelled vehicles and in manner well understood. Under emergency conditions, as by impact of the front of the car with an object or person, the circuit to the electro-magnets 37 is designed to be closed thru the controller 59, as at the contacts 64 and 65, the two being placed at different levels—one at the level of the usual bumper 66 and moved thereby and the other at a lower level thru a secondary or lower bumper 67. Impact upon either of these bumpers will force same inwardly to close a contact 64 or 65 and cause thereby bridging of contacts 68 of the controller thru a bridging bar 70. This momentary contact serves also to break the circuit at the forwardly driving initiating contact switch 60 thru mechanical engagement of an arm 71 thereof with the bridging bar 70 and will establish, moreover, connection to the magnets 37 thru the contacts 68 for drawing in the reverse clutch half. A further and mechanically operated contact 72 may be installed conveniently to the driver of the car and suitable for foot operation to also effect the emergency operation, the contacts 64, 65 and 72 being in multiple. As stated, the circuits from the contacts 64, 65 and 72 all pass thru the controller 59; and upon being closed actuate a solenoid 73 therein, whose plunger 74 is designed in manner hereinafter set forth then to move the bridging bar 70 for furnishing current to the electro-magnets 37 of the clutch, opening at the same time the circuit at the initiating contact switch 60 so that the forward electro-magnets cannot be energized until said switch 60 has again been set, it being understood that the switch 60 remains locked in open position by the arm 61 and detent 62. The spring 75 about the plunger 74 returns said plunger as soon as the current to solenoid 73 is cut off.

In the event that any or all of the contacts 64, 65 and 72 should become jammed and the current therefore maintained to the solenoid with consequent continuation of the reverse motion of the car, provision is made at the controller 59 for further cutting off the energizing current to electromagnets 37 after a predetermined interval. To this end, a detent 76 is carried by the plunger 74, having a cam surface 76′ adapted to ride under a camming member 77 at the forward limit of travel of the plunger. Detent 76, moreover, is slotted to allow of movement at right angles to the travel of the plunger, being normally spring-held upwardly against the plunger until depressed by engagement with the camming member 77. The beveled upper end of detent 76 is arranged to engage a stop 78 secured to a spring plunger 79 working in a cushioning cylinder 80 and carries thereby the plunger 79 outwardly in accordance with the movement of plunger 74. As soon as detent 76 has been depressed, it releases plunger 79 which thus returns independently of the plunger 74, which may still be held in its outermost position due to continued energization of solenoid 73, carrying with it the bridging member 70 to open contacts 68 and thus break the circuit to solenoid 73.

I claim:—

1. The combination with a vehicle, and driving means to propel the same; of an electro-magnetic clutch mechanism included in the driving means and whereby the vehicle may be driven in a forward and a reverse direction; and control means for the clutch operating automatically to set said clutch for reverse motion for a predetermined period and then to restore the clutch to inoperative position.

2. The combination with a vehicle, and driving means to propel the same; of an electro-magnetic clutch mechanism included in the driving means and whereby the vehicle may be driven in a forward and a reverse direction; and control means for the clutch comprising a manually controlled drive initiating contact member to close the circuit to the clutch for forward motion, means to lock said initiating contact member in said position for forward drive, clutch controlled contact means, means to automatically lock the clutch in forward driving position, and means to then automatically open the circuit to said clutch at the clutch controlled contact means, a contact member for setting the clutch for reverse motion, electro-magnetic means controlling the said contact means for reverse motion, and means to actuate said electro-magnetic contact controlling means for reverse motion.

3. The combination with a vehicle, and driving means to propel the same; of an electro-magnetic clutch mechanism included in the driving means and whereby the vehicle may be driven in a forward and a reverse direction; and control means for the clutch comprising a manually controlled drive initiating contact member to close the circuit to the clutch for forward motion, means to lock said initiating contact member in said position for forward drive, clutch controlled contact means, means to automatically lock the clutch in forward driving position, and means to then automatically open the circuit to said clutch at the clutch controlled contact means, a contact member for setting the clutch for reverse motion, electro-magnetic means controlling the said contact means for reverse motion, means to actuate said electro-magnetic contact controlling means for reverse motion, and means to automatically open the circuit to the electro-magnetic contact controlling means for reverse motion.

4. The combination with a vehicle, and driving means to propel the same; of a double electro-magnetic clutch included in the driving means and whereby the vehicle may be driven in a forward or a reverse direction, one clutch portion thereof comprising a clutch half and a series of electro-magnets and contact member mounted thereon, and means actuated when the said electro-magnets are energized to open the said contact member and deenergize said magnets.

5. The combination with a vehicle, and driving means to propel the same; of a double electromagnetic clutch included in the driving means and whereby the vehicle may be driven in a forward or a reverse direction, one clutch portion thereof comprising a clutch half and a series of electro-magnets and contact member mounted thereon, means actuated when the said electro-magnets are energized to open the said contact member and deenergize said magnets, and means to automatically operate the clutch halves of the other clutch portion after said electro-magnets are deenergized.

In testimony whereof I affix my signature.

FRANK L. LOWE.